United States Patent
Bracone, Jr.

(10) Patent No.: US 6,177,004 B1
(45) Date of Patent: Jan. 23, 2001

(54) SEPTIC SYSTEM FILTER APPARATUS

(76) Inventor: Dominic J. Bracone, Jr., 273 Scott Blvd., Kissimmee, FL (US) 34746

(*) Notice: Under 35 U.S.C. 154(b), the term of this patent shall be extended for 0 days.

(21) Appl. No.: 09/473,093

(22) Filed: Dec. 28, 1999

(51) Int. Cl.[7] .................................................. B01D 24/12
(52) U.S. Cl. ........................ 210/86; 210/170; 210/259; 210/265; 210/293; 210/532.2; 210/299; 210/151
(58) Field of Search .................. 210/150, 151, 210/170, 256, 257.1, 259, 265, 289, 291, 293, 299, 532.2, 86

(56) References Cited

U.S. PATENT DOCUMENTS

| | | | |
|---|---|---|---|
| D. 357,737 | 4/1995 | Spearman . | |
| 1,645,116 * | 10/1927 | Rose ..................................... | 210/265 |
| 1,738,521 * | 12/1929 | Bomhoff ............................. | 210/265 |
| 2,760,643 * | 8/1956 | Schaaf ................................ | 210/293 |
| 3,126,333 * | 3/1964 | Williams ............................. | 210/151 |
| 3,950,252 * | 4/1976 | Jordan et al. ...................... | 210/293 |
| 4,011,162 * | 3/1977 | Oldham et al. .................... | 210/151 |
| 4,818,384 | 4/1989 | Mayer . | |
| 4,895,645 * | 1/1990 | Zorich, Jr. ......................... | 210/150 |
| 5,227,051 | 7/1993 | Oshima . | |
| 5,427,679 | 6/1995 | Daniels . | |
| 5,558,763 | 9/1996 | Funakoshi et al. . | |
| 5,674,380 | 10/1997 | Cioara . | |
| 5,738,781 * | 4/1998 | Carlson ............................. | 210/532.2 |
| 5,766,454 * | 6/1998 | Cox et al. .......................... | 210/151 |
| 5,807,480 * | 9/1998 | Kanazawa ......................... | 210/150 |
| 5,989,416 * | 11/1999 | Gorton ............................... | 210/532.2 |

* cited by examiner

*Primary Examiner*—Christopher Upton

(57) ABSTRACT

A septic system filter apparatus for filtering waste water as it travels from a septic tank to a septic field. The septic system filter apparatus includes a filtering system for filtering water from a septic tank for receiving waste material. A filtering apparatus comprises a first housing having a bottom wall and a top wall. The top wall is a removable lid. The first housing has a first inlet port and an exit port. The bottom wall has at least two supports thereon extending upward from an inner surface of the bottom wall. A second housing for holding filtering material has a removable lid thereon. The second housing has dimensions smaller than the first housing to fit into the first housing. A space is defined between the first housing and the second housing. The second housing rests on the supports above the inner surface of the bottom wall. The second housing has a second inlet port located generally adjacent to the first inlet port. The second housing has an upper chamber and lower chamber. A grill separates the upper and lower chambers. Filtering material covers the grill. An inlet pipe delivers fluid from the septic tank to the second housing. The inlet pipe extends through the first and the second inlet ports. An outlet pipe delivers fluid to a septic field from the interior of the first housing. The outlet pipe is fluidly connected to the outlet port in the first housing.

6 Claims, 2 Drawing Sheets

SEPTIC SYSTEM FILTER APPARATUS

BACKGROUND OF THE INVENTION

1. Field of the Invention

The present invention relates to waste water filtering systems and more particularly pertains to a new septic system filter apparatus for filtering waste water as it travels from a septic tank to a septic field.

2. Description of the Prior Art

The use of waste water filtering systems is known in the prior art. More specifically, waste water filtering systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,387,335; 4,104,166; 4,710,295; 3,207,314; 3,156,646; and 5,382,257; 5,427,679; 5,558,763; 5,227,051; 4,818,384; 5,674,380; U.S. Pat. Des. No. 357,737.

While these devices fulfill their respective, particular objectives and requirements, the aforementioned patents do not disclose a new septic system filter apparatus. The inventive device includes a filtering system for filtering water from a septic tank for receiving waste material. A filtering apparatus comprises a first housing having a bottom wall and a top wall. The top wall is a removable lid. The first housing has a first inlet port and an exit port. The bottom wall has at least two supports thereon extending upward from an inner surface of the bottom wall. A second housing for holding filtering material has a removable lid thereon. The second housing has dimensions smaller than the first housing to fit into the first housing. A space is defined between the first housing and the second housing. The second housing rests on the supports above the inner surface of the bottom wall. The second housing has a second inlet port located generally adjacent to the first inlet port. The second housing has an upper chamber and lower chamber. A grill separates the upper and lower chambers. Filtering material covers the grill. An inlet pipe delivers fluid from the septic tank to the second housing. The inlet pipe extends through the first and the second inlet ports. An outlet pipe delivers fluid to a septic field from the interior of the first housing. The outlet pipe is fluidly connected to the outlet port in the first housing.

In these respects, the septic system filter apparatus according to the present invention substantially departs from the conventional concepts and designs of the prior art, and in so doing provides an apparatus primarily developed for the purpose of filtering waste water as it travels from a septic tank to a septic field.

SUMMARY OF THE INVENTION

In view of the foregoing disadvantages inherent in the known types of waste water filtering systems now present in the prior art, the present invention provides a new septic system filter apparatus construction wherein the same can be utilized for filtering waste water as it travels from a septic tank to a septic field.

The general purpose of the present invention, which will be described subsequently in greater detail, is to provide a new septic system filter apparatus apparatus and method which has many of the advantages of the waste water filtering systems mentioned heretofore and many novel features that result in a new septic system filter apparatus which is not anticipated, rendered obvious, suggested, or even implied by any of the prior art waste water filtering systems, either alone or in any combination thereof.

To attain this, the present invention generally comprises a filtering system for filtering water from a septic tank for receiving waste material. A filtering apparatus comprises a first housing having a bottom wall and a top wall. The top wall is a removable lid. The first housing has a first inlet port and an exit port. The bottom wall has at least two supports thereon extending upward from an inner surface of the bottom wall. A second housing for holding filtering material has a removable lid thereon. The second housing has dimensions smaller than the first housing to fit into the first housing. A space is defined between the first housing and the second housing. The second housing rests on the supports above the inner surface of the bottom wall. The second housing has a second inlet port located generally adjacent to the first inlet port. The second housing has an upper chamber and lower chamber. A grill separates the upper and lower chambers. Filtering material covers the grill. An inlet pipe delivers fluid from the septic tank to the second housing. The inlet pipe extends through the first and the second inlet ports. An outlet pipe delivers fluid to a septic field from the interior of the first housing. The outlet pipe is fluidly connected to the outlet port in the first housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new septic system filter apparatus apparatus and method which has many of the advantages of the waste water filtering systems mentioned heretofore and many novel features that result in a new septic system filter apparatus which is not anticipated, rendered obvious, suggested, or even implied by any of the prior art waste water filtering systems, either alone or in any combination thereof.

It is another object of the present invention to provide a new septic system filter apparatus which may be easily and efficiently manufactured and marketed.

It is a further object of the present invention to provide a new septic system filter apparatus which is of a durable and reliable construction.

An even further object of the present invention is to provide a new septic system filter apparatus which is susceptible of a low cost of manufacture with regard to both materials and labor, and which accordingly is then susceptible of low prices of sale to the consuming public, thereby making such septic system filter apparatus economically available to the buying public.

Still yet another object of the present invention is to provide a new septic system filter apparatus which provides in the apparatuses and methods of the prior art some of the advantages thereof, while simultaneously overcoming some of the disadvantages normally associated therewith.

Still another object of the present invention is to provide a new septic system filter apparatus for filtering waste water as it travels from a septic tank to a septic field.

Yet another object of the present invention is to provide a new septic system filter apparatus which includes a filtering system for filtering water from a septic tank for receiving waste material. A filtering apparatus comprises a first housing having a bottom wall and a top wall. The top wall is a removable lid. The first housing has a first inlet port and an exit port. The bottom wall has at least two supports thereon extending upward from an inner surface of the bottom wall. A second housing for holding filtering material has a removable lid thereon. The second housing has dimensions smaller than the first housing to fit into the first housing. A space is defined between the first housing and the second housing. The second housing rests on the supports above the inner surface of the bottom wall. The second housing has a second inlet port located generally adjacent to the first inlet port. The second housing has an upper chamber and lower chamber. A grill separates the upper and lower chambers. Filtering material covers the grill. An inlet pipe delivers fluid from the septic tank to the second housing. The inlet pipe extends through the first and the second inlet ports. An outlet pipe delivers fluid to a septic field from the interior of the first housing. The outlet pipe is fluidly connected to the outlet port in the first housing.

Still yet another object of the present invention is to provide a new septic system filter apparatus that keeps sludge and grease from accumulating in the septic field.

Even still another object of the present invention is to provide a new septic system filter apparatus that contains a filtering material which can be easily and cost-effectively replaced.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
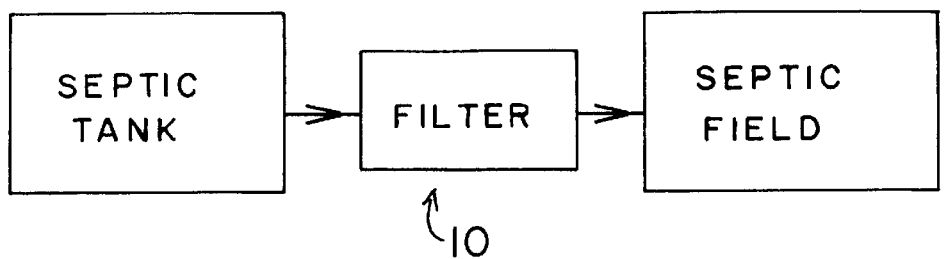
FIG. 1 is a schematic plan view of a new septic system filter apparatus according to the present invention.
Figure 2:
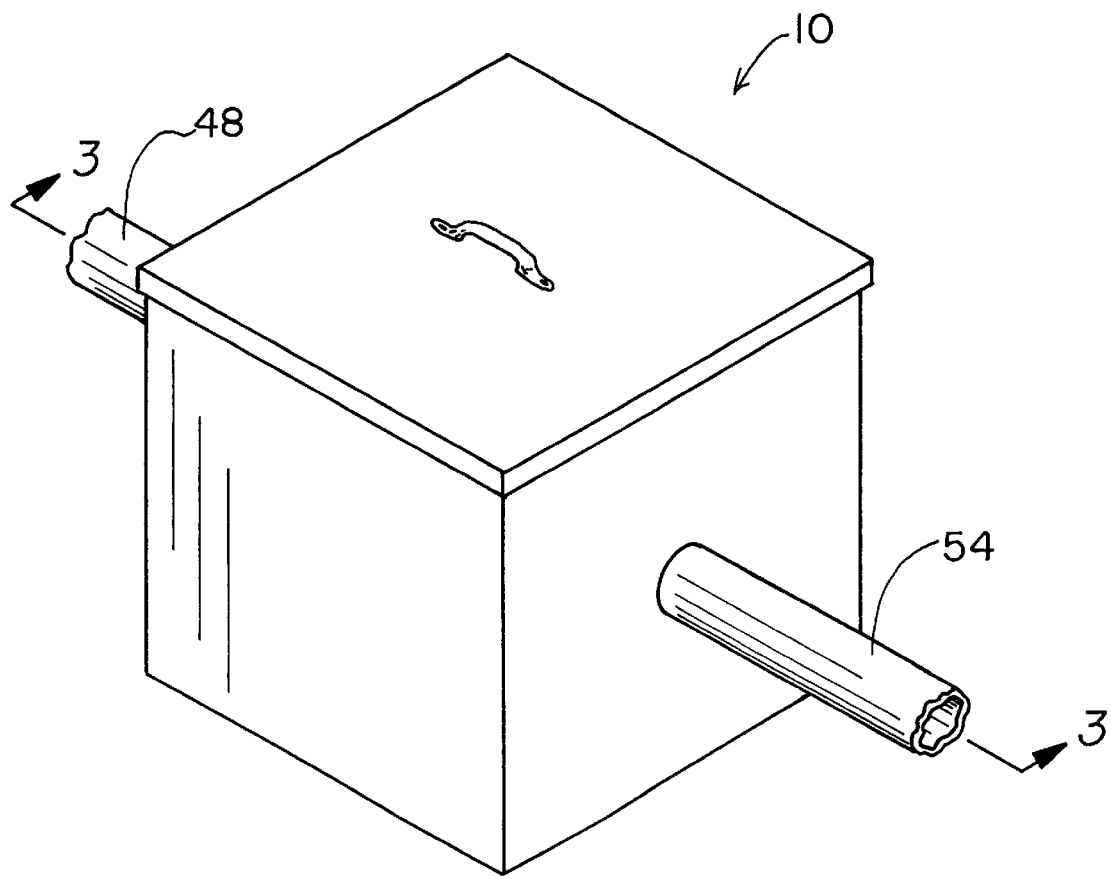
FIG. 2 is a schematic perspective view of the present invention.
Figure 3:
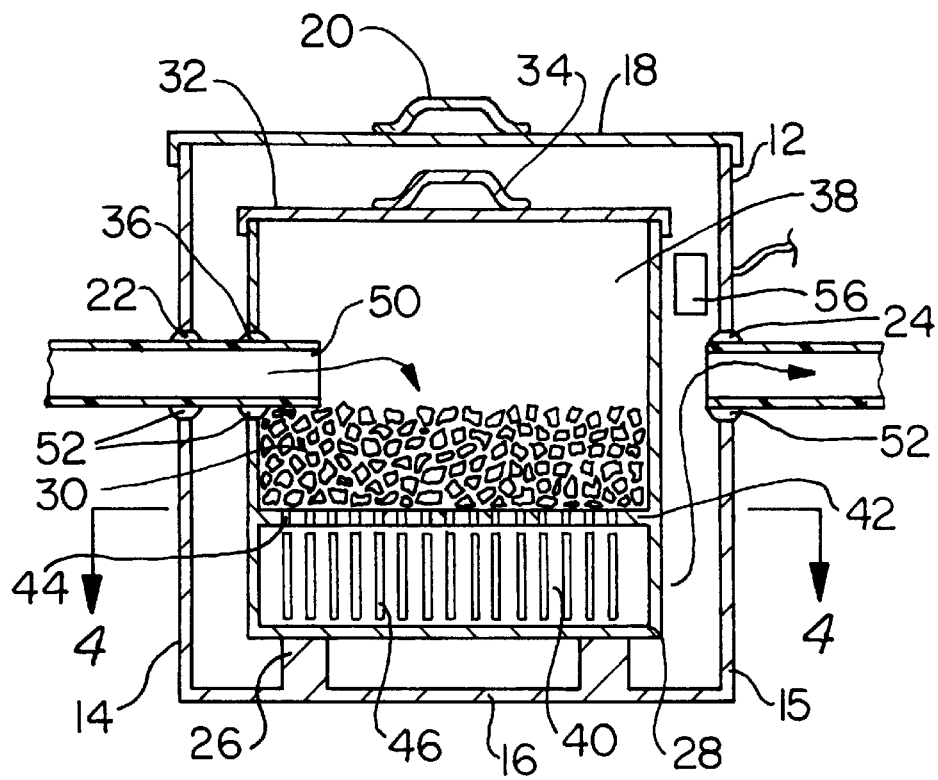
FIG. 3 is a schematic side cross-sectional view taken along line 3—3 of the present invention.
Figure 4:
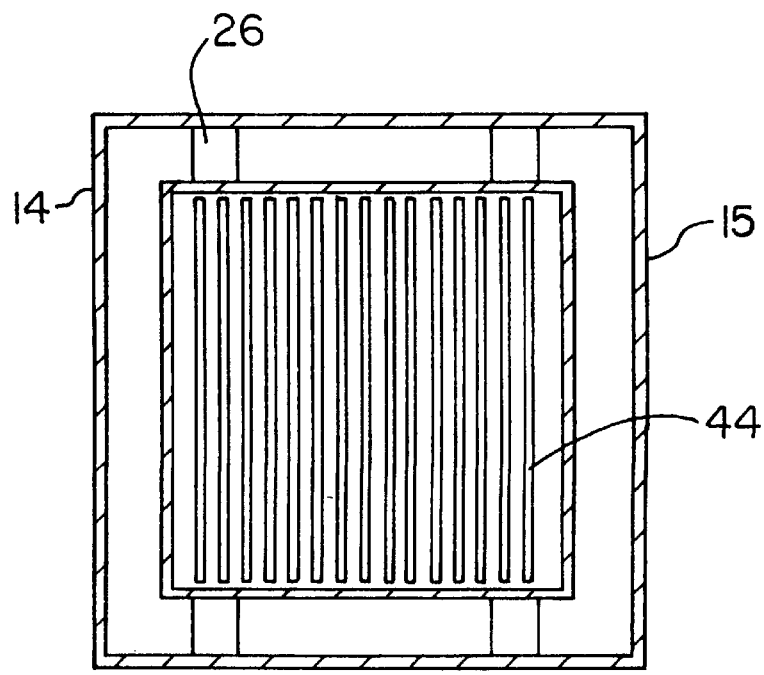
FIG. 4 is a schematic top cross-sectional view taken along line 4–4 of the present invention.

With reference now to the drawings, and in particular to FIGS. 1 through 4 thereof, a new septic system filter apparatus embodying the principles and concepts of the present invention and generally designated by the reference numeral 10 will be described.

As best illustrated in FIGS. 1 through 4, the septic system filter apparatus 10 generally comprises a filtering apparatus connected to septic tank via a septic tank outlet.

The filtering apparatus comprises a first housing 12. The housing is generally rectangular having a pair of opposing sides 14, 15. The housing has a bottom wall 16 and a top wall 18. The top wall is a removable lid and has an exterior surface that has a handle 20 thereon. The first housing has a first inlet port 22 and an exit port 24. Preferably, the first inlet port 22 is in one of the opposing sides 14 and the exit port 24 is in the other of the opposing sides 15. Ideally, the first inlet port 22 and the exit port 24 are axially aligned and are positioned relatively nearer to the top wall 18 than the bottom wall 16. Preferably, the bottom wall 16 has an inner surface having four supports 26 extending up therefrom. The supports 26 are generally rectangular.

A second housing 28 for holding filtering material 30 is preferably rectangular. The second housing has a removable lid 32 thereon and the lid has an outside surface having handle 34 thereon. The second housing 28 has dimensions smaller than the first housing 12 such that the second housing fits within the first housing. A space is defined between an interior surface of the first housing and an exterior surface of the second housing. The second housing 28 rests on the four supports 26 above the inner surface of the bottom wall of the second housing. The second housing 28 has a second inlet port 36 located generally adjacent to the first inlet port 22 such that the first inlet port 22 of the first housing 12 is axially aligned with the second inlet port 36. The second housing 28 has an upper chamber 38 and lower chamber 40. A grill 42 situated below the second inlet port 36 separates the upper and lower chambers. The grill 42 has slots 44 therein. The lower chamber 40 has a plurality of vertical plates 46 therein. The plates 46 are parallel to the opposing sides 14, 15 of the first housing. Fluid entering the second inlet port 36 flows through the grill 42 and out of the second housing 28 and into the first housing 12. Filtering material 30 covers the grill. The filtering material is made up of individual portions of filtering material. The portions individually have a size too great to fit through the slots 44 in the grill. This prevents loss of the filtering material. Preferably, the filtering material 30 is charcoal.

An inlet pipe 48 for delivering fluid from the outlet of the septic tank to the second housing 12 extends through the first 22 and the second inlet ports 36 such that an end of the inlet pipe 50 is above the grill in the second housing. A pair of O-rings 52 secures the inlet pipe in the first and second inlet ports. Each of the O-rings is preferably made from an elastomeric material.

An outlet pipe 54 for delivering fluid to a septic field from the interior of the first housing 12 is fluidly connected to the outlet port 24 in the first housing. An O-ring 52 secures the outlet pipe in the outlet port. Preferably, the O-ring is made from an elastomeric substance.

Ideally, a fluid sensor 56 for detecting high levels of fluid in the first box 12 is mounted in the space between the second 28 and first housings 12. The sensor 56 should be located on one of the opposing walls 15 generally adjacent to the top wall 18 of the first housing. The sensor 56 is operationally coupled to a power supply and is adapted to sound an alarm should the water level rise too high.

In use, charcoal or other filtering material 30 placed inside the second housing 28 on the grill 42. The inlet pipe 48 from the septic tank is placed through the first 22 and second inlet ports 36 to deliver waste water from the septic tank into the second housing 28. The waste water flows through the filtering material 30 which removes grease and other waste from the water. The water travels through the grill 42 and out of the bottom of the second housing 28 into the first housing 12. The water then leaves thought the outlet pipe 54 to spill into the septic field.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water filter system for filtering waste water after it leaves a septic tank and before it enters a septic field, comprising:
   a septic tank for receiving waste material, said septic tank having an outlet;
   a filtering apparatus comprising:
      a first housing, said housing having a bottom wall and a top wall, said top wall being a removable lid, said first housing having a first inlet port and an exit port, said bottom wall having at least two supports thereon, said supports extending upward from an inner surface of said bottom wall toward said top wall;
      a second housing for holding filtering material, said housing having a removable lid thereon, said second housing having dimensions smaller than said first housing such that said second housing fits within said first housing, wherein a space is defined between an interior surface of said first housing and an exterior surface of said second housing, said second housing resting on said supports above the inner surface of the bottom wall, said second housing having a second inlet port, said second inlet port being located generally adjacent to said first inlet port, said second housing having an upper chamber and lower chamber, said upper and lower chambers being separated by a grill situated below said second inlet port, said grill being covered by filtering material;
      an inlet pipe for delivering fluid from the outlet of said septic tank to said second housing, said inlet pipe extending through said first and said second inlet ports;
      an outlet pipe for delivering fluid to a septic field from the interior of said first housing, said outlet pipe being fluidly connected to said outlet port in said first housing.

2. The water filter system for filtering waste water after it leaves a septic tank and before it enters a septic field as in claim 1, wherein said first housing comprises:
   said housing being generally rectangular, said housing having a pair of opposing sides, said first inlet port being in one of said opposing sides and said exit port being in the other of said opposing sides, said first inlet port and said exit port being axially aligned, said first inlet port and said exit port being positioned relatively nearer to said top wall than said bottom wall.

3. The water filter system for filtering waste water after it leaves a septic tank and before it enters a septic field as in claim 2, wherein said second housing comprises:
   said second housing being generally rectangular, second inlet port being located generally adjacent to said first inlet port such that said first inlet port of said first housing is axially aligned with said second inlet port, said grill being situated below said second inlet port, said lower chamber having a plurality of vertical plates therein.

4. The water filter system for filtering waste water after it leaves a septic tank and before it enters a septic field as in claim 1, further including:
   said inlet pipe extending past said second inlet port to a point above said grill in said second housing, said inlet pipe being secured in said first and second inlet ports by a pair of O-rings, each of said O-rings being made from an elastomeric material; and
   said outlet pipe being secured in said outlet port by an O-ring, said O-ring being made from an elastomeric substance.

5. The water filter system for filtering waste water after it leaves a septic tank and before it enters a septic field as in claim 1, further including:
   a fluid sensor for detecting high levels of fluid in said first box, said fluid sensor being mounted in said space between said second and first housings, said sensor being located generally adjacent to said top wall of said first housing, said sensor adapted to sound an alarm when fluid touches said sensor.

6. A water filter system for filtering waste water after it leaves a septic tank and before it enters a septic field, comprising:
   a septic tank for receiving waste material, said septic tank having an outlet;
   a filtering apparatus comprising:
      a first housing, said housing being generally rectangular, said housing having a pair of opposing sides, said housing having a bottom wall and a top wall, said top wall being a removable lid, said top wall having an exterior surface having a handle thereon, said first housing having a first inlet port and an exit port, said first inlet port being in one of said opposing sides and said exit port being in the other of said opposing sides, said first inlet port and said exit port being axially aligned, said first inlet port and said exit port being positioned relatively nearer to said top wall than said bottom wall, said bottom wall having an inner surface, said inner surface having four supports extending up therefrom, said supports being generally rectangular;

a second housing for holding filtering material, said second housing being generally rectangular, said second housing having a removable lid thereon, said lid having an outside surface having a handle thereon, said second housing having dimensions smaller than said first housing such that said second housing fits within said first housing, wherein a space is defined between an interior surface of said first housing and an exterior surface of said second housing, said second housing resting on said four supports above the inner surface of the bottom wall, said second housing having a second inlet port, said second inlet port being located generally adjacent to said first inlet port such that said first inlet port of said first housing is axially aligned with said second inlet port, said second housing having an upper chamber and lower chamber, said upper and lower chambers being separated by a grill situated below said second inlet port, said grill having slots therein, said lower chamber having a plurality of vertical plates therein, said plates being parallel to said opposing sides of said first housing, wherein fluid entering said second inlet port flows through said grill and out of said second housing and into said first housing, said grill being covered by filtering material, said filtering material being made up of individual portions of filtering material, said portions having a size too great to fit through said slots in said grill, said filtering material being charcoal;

an inlet pipe for delivering fluid from the outlet of said septic tank to said second housing, said inlet pipe extending through said first and said second inlet ports such that an end of said inlet pipe is above said grill in said second housing, said inlet pipe being secured in said first and second inlet ports by a pair of O-rings, each of said O-rings being made from an elastomeric material;

an outlet pipe for delivering fluid to a septic field from the interior of said first housing, said outlet pipe being fluidly connected to said outlet port in said first housing, said outlet pipe being secured in said outlet port by an O-ring, said O-ring being made from an elastomeric substance; and a fluid sensor for detecting high levels of fluid in said first box, said fluid sensor being mounted in said space between said second and first housings, said sensor being located on one of said opposing walls generally adjacent to said top wall of said first housing, said sensor adapted to sound an alarm when fluid touches said sensor.

* * * * *